United States Patent [19]
Williams et al.

[11] Patent Number: 5,627,884
[45] Date of Patent: May 6, 1997

[54] METHOD FOR RETURNING INBOUND CALLS

[76] Inventors: Mark J. Williams, 1835 Beacon Hill Cir., #11, Cuyahoga Falls, Ohio 44221; Gregory A. Nightingale, 33 Devonshire Dr., Akron, Ohio 44312; Todd A. Randolph, 87 Wilbur Dr., Monroe Falls, Ohio 44262

[21] Appl. No.: 494,519

[22] Filed: Jun. 26, 1995

[51] Int. Cl.$^6$ .......................... H04M 1/64; H04M 15/06; H04M 3/42; H04M 3/00
[52] U.S. Cl. .................. 379/88; 379/127; 379/142; 379/216; 379/251; 379/266; 379/309; 379/356
[58] Field of Search .................. 379/67, 88, 89, 379/142, 201, 207, 213, 214, 265, 266, 309, 127, 209, 216, 251, 355, 356

[56] References Cited

U.S. PATENT DOCUMENTS

| | | | |
|---|---|---|---|
| 4,805,209 | 2/1989 | Baker, Jr. et al. | 379/96 |
| 4,924,491 | 5/1990 | Compton et al. | 379/37 |
| 5,040,208 | 8/1991 | Jolissaint | 379/209 |
| 5,155,761 | 10/1992 | Hammond | 379/67 |
| 5,181,236 | 1/1993 | La Vallee et al. | 379/67 |
| 5,185,782 | 2/1993 | Srinivasan | 379/67 |
| 5,185,786 | 2/1993 | Zwick | 379/201 |
| 5,283,824 | 2/1994 | Shaw | 379/142 |
| 5,502,761 | 3/1996 | Duncan et al. | 379/142 |

*Primary Examiner*—Krista M. Zele
*Assistant Examiner*—Harry S. Hong
*Attorney, Agent, or Firm*—Pearne, Gordon, McCoy & Granger

[57] ABSTRACT

Caller information is automatically taken from a caller on hold, the call disconnected and the call returned at the time when the caller would have been serviced had the caller stayed on hold. The caller's number is verified and either DTMF or verbal extension information is used to reconnect the call.

6 Claims, 4 Drawing Sheets

METHOD FOR RETURNING INBOUND CALLS

BACKGROUND OF THE INVENTION

This invention relates to inbound telephone call processing and, in particular, to a method for automatic callback.

Many organizations have large volumes of inbound telephone calls directed to a limited group of agents. Examples include reservation clerks, dial-up technical support, customer service representatives, mail-order catalog clerks, etc.

The number of such agents used is typically related to the average number needed to handle the load. Unfortunately, individual calls do not come at the average rate, nor last only the average time. This results in inbound calls being put on hold for significant periods of time.

In the case of inbound area code 800 or WATS calls, this hold time is a direct expense to the organization. It is estimated that about 35 percent of 800 number charges are for hold time. This represents billions of dollars a year in extra expense to the organizations that subscribe to 800 service. Furthermore, hold time requires extra inbound lines for not only those using 800 numbers, but also for those using conventional long distance and local inbound numbers.

Much of this expense could be saved if hold time could be eliminated or reduced without resorting to hiring agents on the basis of peak demand instead of average demand.

One way of eliminating hold time is not to permit it. Unfortunately, most customers dislike busy signals even more than they dislike being on hold.

SUMMARY OF THE INVENTION

The present invention reduces an organization's hold time expense and permits the use of fewer inbound lines. In addition, it allows more business to be conducted on cheaper conventional long distance and local outbound lines. Furthermore, it is possible to assure customers that they will be serviced at the same time they would have been helped had they sat unproductively on hold.

The invention is a method for electronically processing a holding inbound telephone call.

The method includes determining caller information. Determining the caller information includes transmitting an automatic number identification telephone number by speech to the caller for verification. If the automatic number identification number is not accepted by the caller, a caller supplied telephone number is used as the caller telephone number. The caller is prompted for the caller name, which is recorded.

The caller information is entered into a callback queue and the inbound telephone call is disconnected. Using the caller information from the callback queue, a callback call is placed to the caller and a free agent connected to the caller.

Alternatively, determining the caller information includes determining the caller telephone number, prompting the caller for the caller name and recording the caller name. The caller is prompted for an indication of no extension, a machine dialable extension, or a verbal extension. The indication and the machine dialable extension or the verbal extension, if any, are recorded.

The caller information is entered in the callback queue and the inbound telephone call disconnected. Using the caller information from the callback queue, a callback call is placed to the caller. If no extension is indicated, the caller telephone number is dialed and the caller is audibly addressed by the caller name. If a machine dialable extension is indicated, the caller telephone number and machine dialable extension are dialed and the caller audibly addressed by the caller name. If a verbal extension is indicated, the caller telephone number is dialed, the verbal extension audibly requested and the caller audibly addressed by the caller name. Then the free agent is connected to the caller.

DESCRIPTION OF THE PREFERRED EMBODIMENTS

Figure 1:
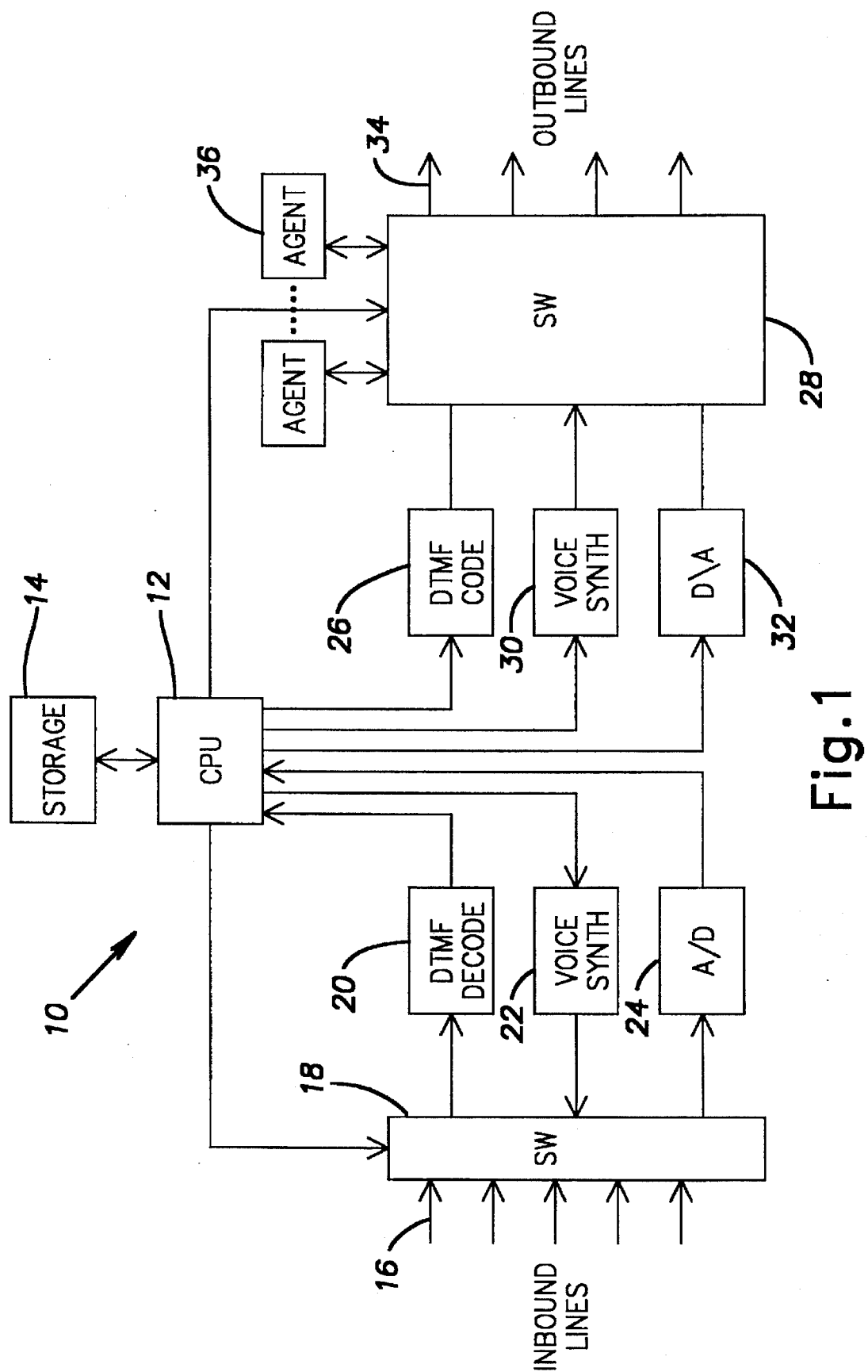
FIG. 1 is a block diagram of a call processing system suitable for using a method according to the invention.

Referring to FIG. 1, a call processing system 10 includes a CPU 12 with storage 14. The CPU 12 and storage 14 may be, for example, a microprocessor-based personal computer with RAM and a disk drive. Inbound phone lines 16 are connected to a selector switch 18 controlled by the CPU 12. A DTMF decoder 20 decodes DTMF codes from the switch 18 to digital format for the CPU 12. A voice synthesizer 22 provides audible speech to the switch 18 in response to the CPU 12. An A/D converter 24 provides digitized audio from the switch 18 to the CPU 12. The switch 18 selects which of the inbound lines 16 is connected to the DTMF decoder 20, the voice synthesizer 22 and the A/D converter 24.

A DTMF coder 26 encodes DTMF codes from digital signals from the CPU 12 for a selector switch 28. A voice synthesizer 30 provides audible speech to the switch 28 in response to the CPU 12. A D/A converter 32 provides analog audio to the switch 28 in response to the CPU 12. The switch 28 selects which of the outbound lines 34 is connected to the DTMF coder 26, the voice synthesizer 30, the D/A converter 32 and the call-handling agents 36. The switch 28 operates in response to the CPU 12.

The system 10 may also advantageously include voice recognition capability to avoid some or all situations requiring the caller to push telephone push buttons in response to directions from the system 10.

Figure 2:
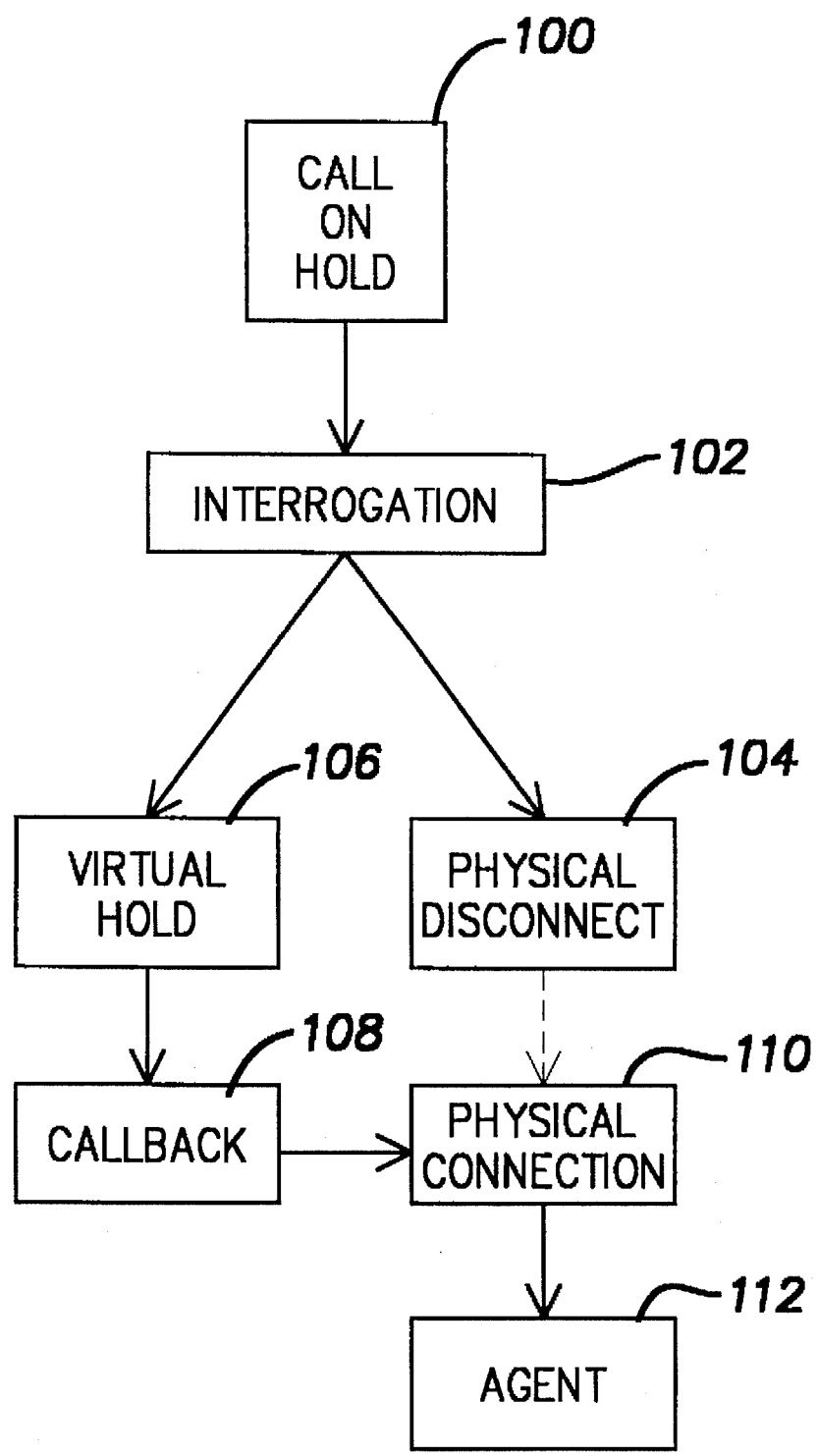
FIG. 2 is flow chart diagram of a method for electronically processing a call according to the invention.

Referring to FIG. 2, a call on hold is interrogated by the system 10 to determine the caller information necessary to reestablish the call. The call is then physically disconnected, but placed in a "virtual hold" status. In "virtual hold" status, the caller information is placed in a callback queue and when an agent is going to be available to take the call, a callback is initiated by taking the caller information from the callback queue. This reestablishes the physical connection. The call is then transferred to the agent.

Figure 3:
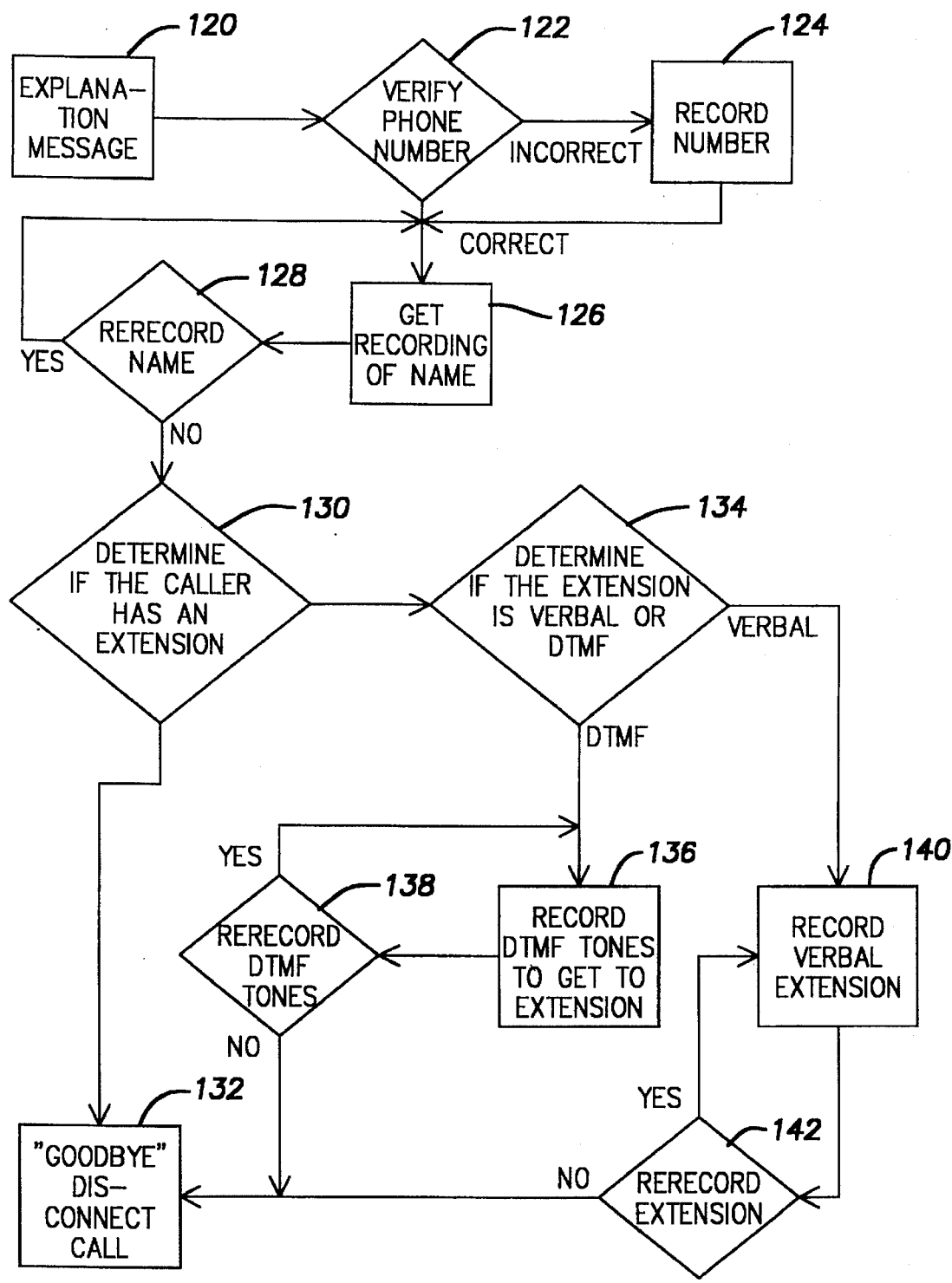
FIG. 3 is a flow chart diagram further illustrating a caller information determining method according to the invention.

Referring to FIG. 3, the caller interrogation process starts with an explanatory message to the caller. If the system has a potential caller phone number, for example, from an automatic number identification system, the number is synthesized to the caller for acceptance. If the system has no calling number, or an unacceptable number, the caller dials the correct number, which is recorded by the system.

The system then prompts the caller to speak his or her name, which is also recorded.

The caller is then prompted to indicate if he or she has an extension number. The caller may, for example, indicate yes or no with telephone keypad entries or verbally in combination with voice recognition.

If the caller indicates no extension, the call is disconnected and placed on "virtual hold." If the caller dials a DTMF extension, these machine dialable codes are recorded and the call is disconnected and placed on "virtual hold." If the caller speaks a verbal extension, the caller's words are recorded and the call is disconnected and placed on "virtual hold."

Figure 4:
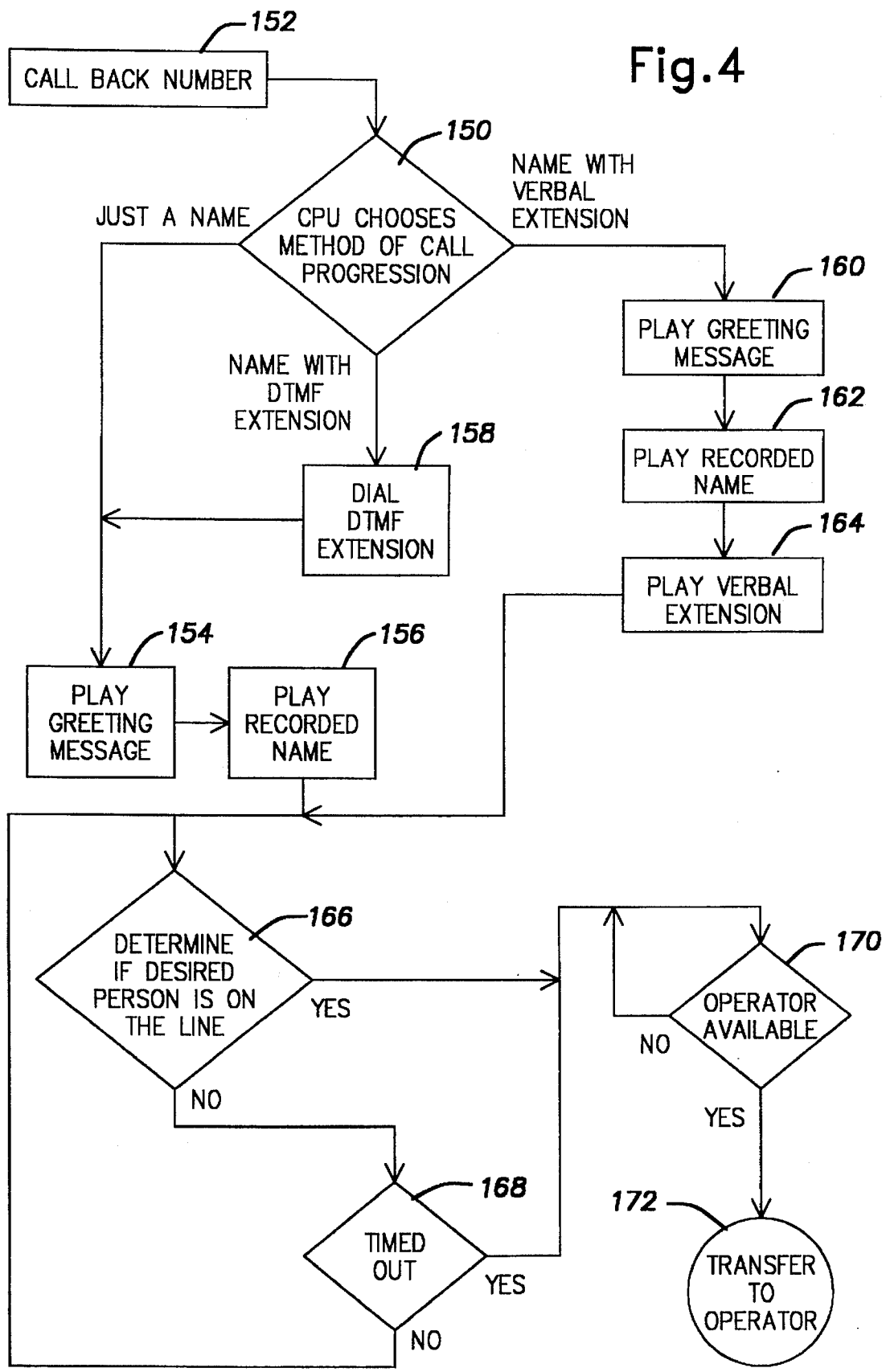
FIG. 4 is a flow chart diagram further illustrating a callback method using the caller information according to the invention.

Referring to FIG. 4, the callback process starts when an agent appears to be about to become available. In the preferred embodiment the callback process starts when the "virtual hold" corresponds in time with the time the caller would have spent on actual hold. This may be accomplished, for example, by taking all calls in order from only the callback queue unless it is empty.

The system reads the caller information from the callback queue and calls the caller number.

If no extension has been indicated, the system plays a greeting message and the caller name. The call is then transferred to the next free agent.

If a DTMF extension has been indicated, the system dials the DTMF extension and proceeds as above.

If a verbal extension has been indicated, an explanatory message is played, along with the calling name and verbal extension in order to request the verbal extension. After a delay, the greeting message and caller name are played. The call is then transferred to the next free agent.

With this invention, organizations can greatly reduce the amount of expensive, unproductive, 800 number hold time they are forced to pay for. In addition, the callbacks can be made using more economical conventional long distance calls or, in some cases, even local calls. Also, reducing customers on hold frees up lines, thereby lowering the number of lines required.

Customers are also relieved from having to sit on hold to keep their place in the queue. This allows customers to be more productive.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A method for electronically processing a holding inbound telephone call placed by a caller having a called telephone number and a caller name, said method comprising:

determining caller information, said determining caller information including:
      transmitting an automatic number identification telephone number by speech to said caller for verification and if said automatic number identification number is not accepted by the caller, using a caller supplied telephone number as said caller telephone number;
      prompting said caller for said caller name, and recording said caller name;
      prompting said caller for an indication of no extension, a machine dialable extension, or a verbal extension and recording said indication and said machine dialable extension or said verbal extension, if any; and
   entering said caller information in a callback queue;
   disconnecting said inbound telephone call;
   using said caller information from said callback queue to place a callback call to said caller, wherein said step of using said caller information includes:
      if no extension is indicated, dialing said caller telephone number and audibly addressing said caller by said caller name;
      if a machine dialable extension is indicated, dialing said caller telephone number and machine dialable extension and audibly addressing said caller by said caller name; or
      if a verbal extension is indicated, dialing said caller telephone number, audibly requesting said verbal extension and audibly addressing said caller by said caller name; and
   connecting a free agent to said caller.

2. A method according to claim 1, wherein said connecting is made to occur at a time when said free agent would have been connected to the holding inbound call.

3. A method for electronically processing a holding inbound telephone call placed by a caller having a caller telephone number and a caller name, said method comprising:

determining caller information, said determining caller information including:
      determining said caller telephone number;
      prompting said caller for said caller name and recording said caller name;
      prompting said caller for an indication of no extension, a machine dialable extension, or a verbal extension and recording said indication and said machine dialable extension or said verbal extension, if any;
   entering said caller information in a callback queue;
   disconnecting said inbound telephone call;
   using said caller information from said callback queue to place a callback call to said caller, said step of using said caller information including:
      if no extension is indicated, dialing said caller telephone number and audibly addressing said caller by said caller name;
      if a machine dialable extension is indicated, dialing said caller telephone number and machine dialable extension and audibly addressing said caller by said caller name; or
      if a verbal extension is indicated, dialing said caller telephone number, audibly requesting said verbal extension and audibly addressing said caller by said caller name; and
   connecting a free agent to said caller.

4. A method according to claim 3, wherein said step of determining caller information includes transmitting an automatic number identification telephone number by speech to said caller for verification and if said automatic number identification number is not accepted by the caller, using a caller supplied telephone number as said caller telephone number.

5. A method according to claim 3, wherein said connecting is made to occur at a time when said free agent would have been connected to the holding inbound call.

6. A method for electronically processing a holding inbound telephone call placed by a caller having a caller telephone number and a caller name, said method comprising:

determining caller information, said determining caller information including:

transmitting an automatic number identification telephone number by speech to said caller for verification and if said automatic number identification number is not accepted by the caller, using a caller supplied telephone number as said caller telephone number prompting said caller for said caller name and recording said caller name;

prompting said caller for an indication of no extension, a machine dialable extension, or a verbal extension and recording said indication and said machine dialable extension or said verbal extension, if any;

entering said caller information in a callback queue;

disconnecting said inbound telephone call;

using said caller information from said callback queue to place a callback call to said caller, said step of using said caller information including:

if no extension is indicated, dialing said caller telephone number and audibly addressing said caller by said caller name;

if a machine dialable extension is indicated, dialing said caller telephone number and machine dialable extension and audibly addressing said caller by said caller name; or if a verbal extension is indicated, dialing said caller telephone number, audibly requesting said verbal extension and addressing said caller by said caller name; and connecting an agent to said caller at a time when said agent would have been connected to the holding inbound call.

* * * * *

UNITED STATES PATENT AND TRADEMARK OFFICE
CERTIFICATE OF CORRECTION

PATENT NO. : 5,627,884
DATED : May 6, 1997
INVENTOR(S) : Mark J. Williams, et al.

It is certified that error appears in the above-indentified patent and that said Letters Patent is hereby corrected as shown below:

Claim 1, line 2 (Col. 3, line 51), delete "called" and insert therefor --caller--.

Signed and Sealed this

Twelfth Day of August, 1997

Attest:

Attesting Officer

BRUCE LEHMAN
Commissioner of Patents and Trademarks